March 8, 1960　　　V. R. POWELL　　　2,927,372
METHOD FOR FORMING CLOSE TOLERANCE TUBING AND ARTICLES THEREON
Filed May 31, 1955　　　　　　　　　　　　　5 Sheets-Sheet 2
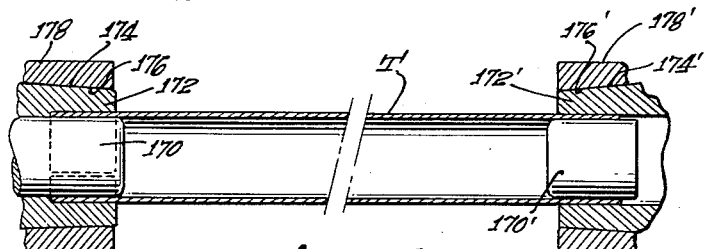
 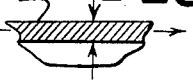
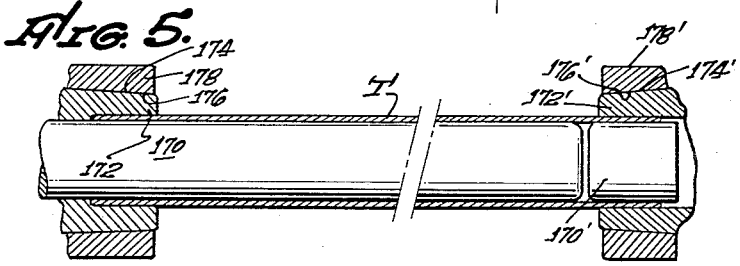
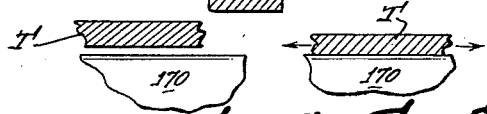
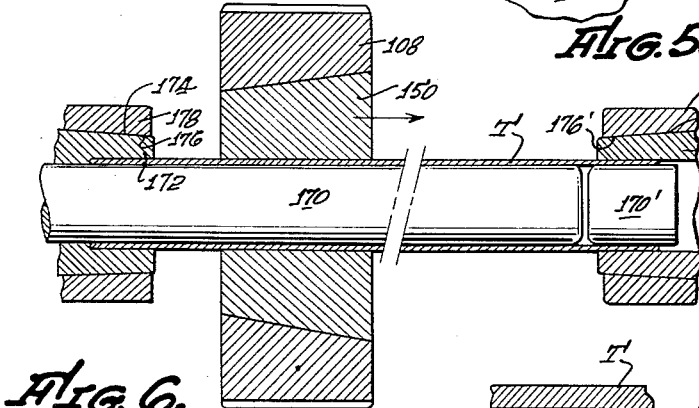 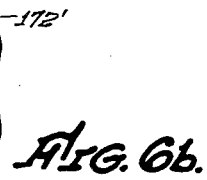
VERNON R. POWELL,
INVENTOR.
BY William C. Babcock
ATTORNEY.

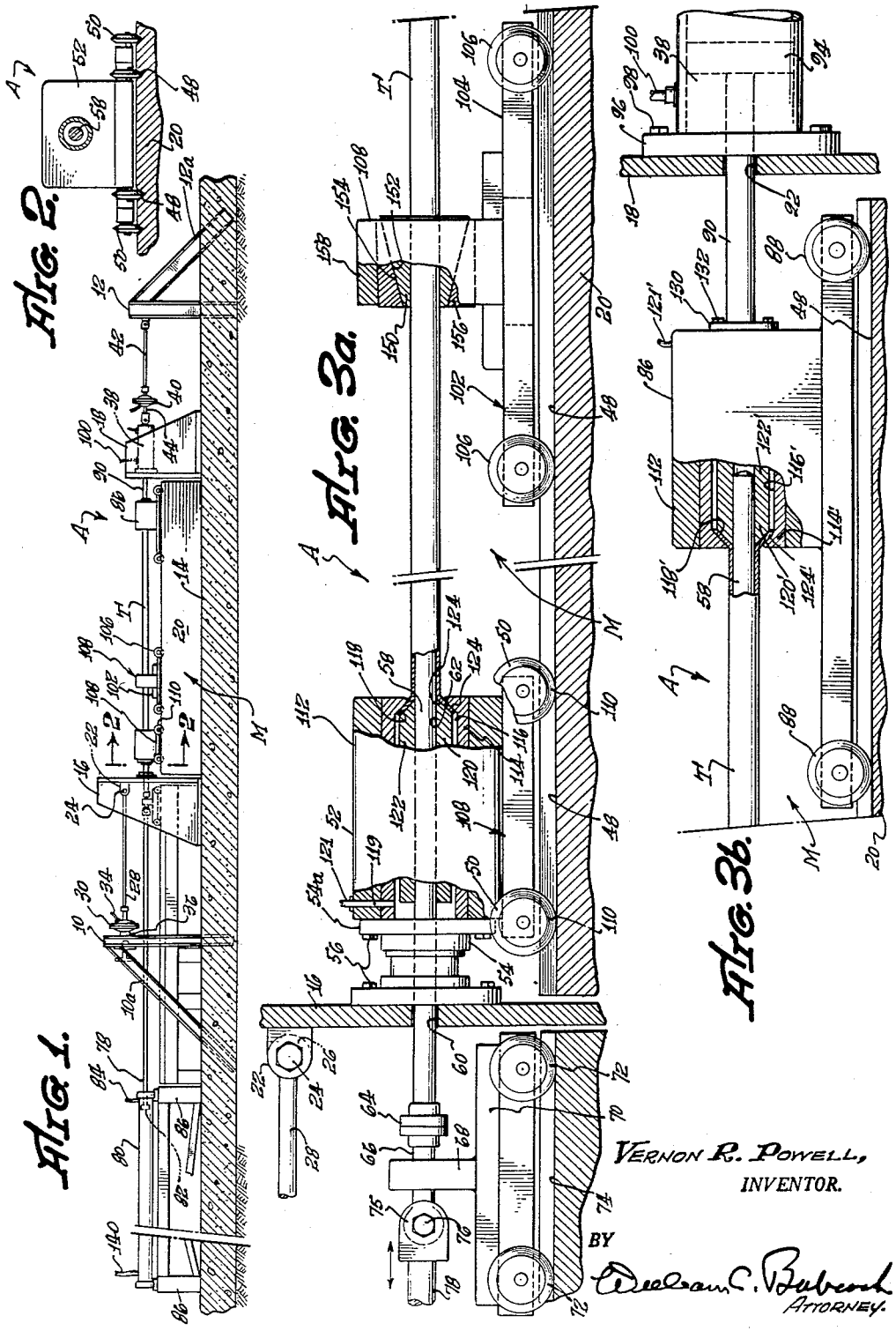

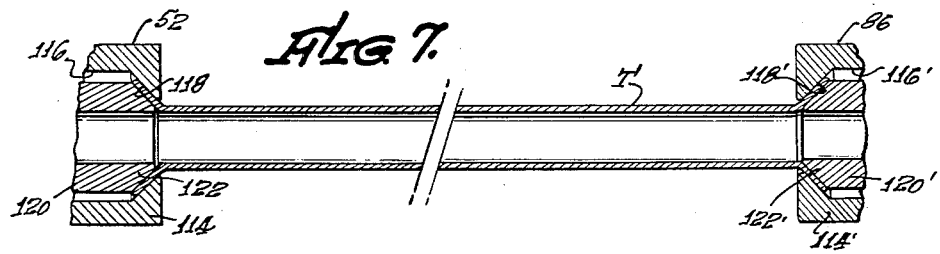
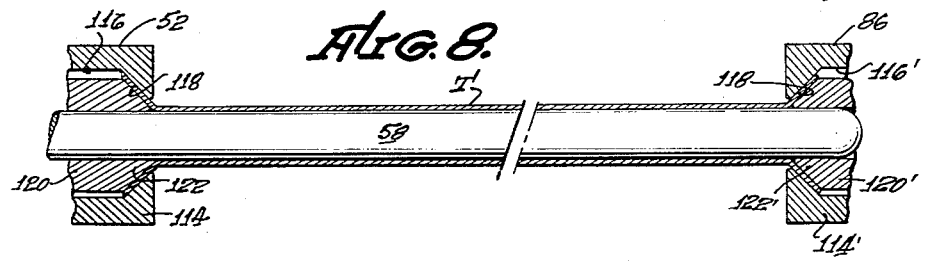
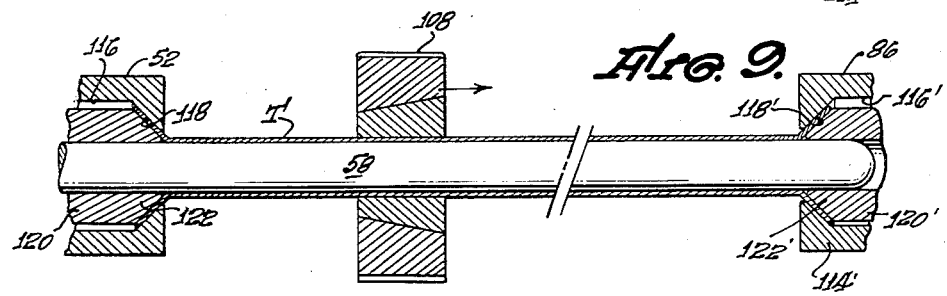
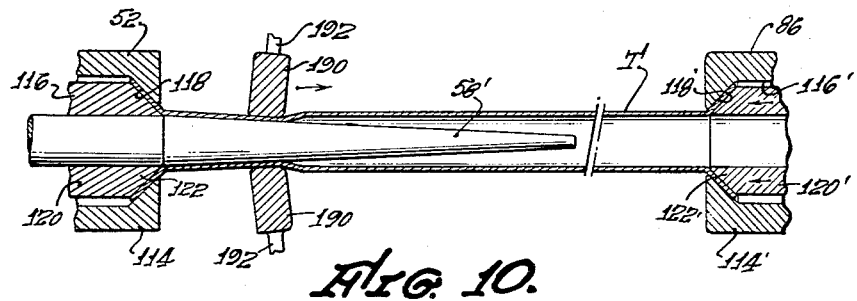

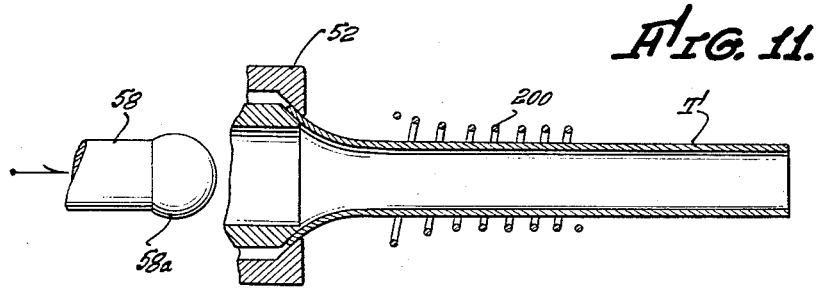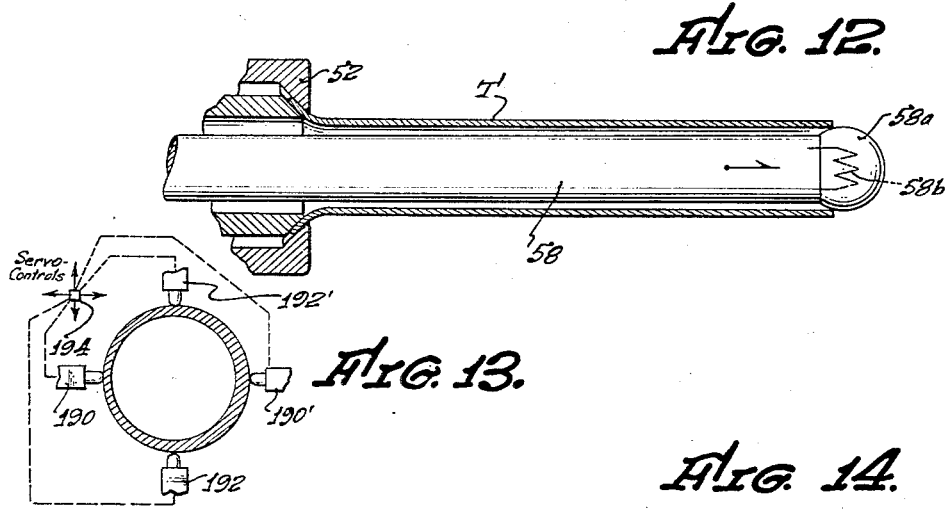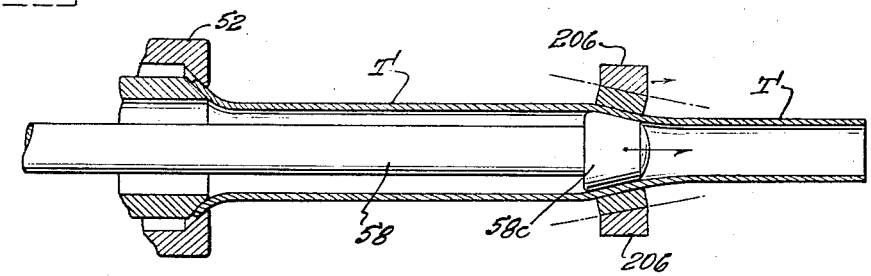

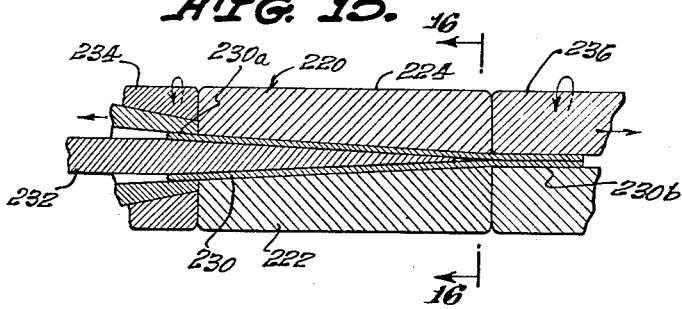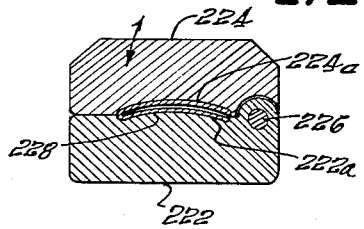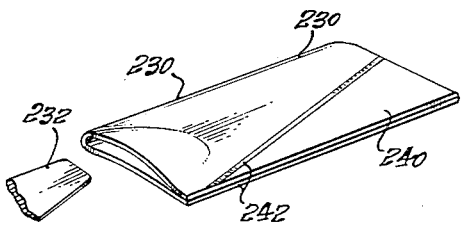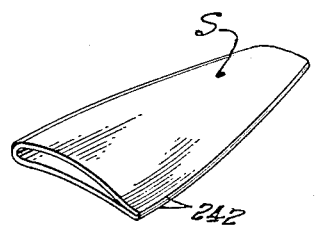

United States Patent Office 2,927,372
Patented Mar. 8, 1960

2,927,372

METHOD FOR FORMING CLOSE TOLERANCE TUBING AND ARTICLES THEREON

Vernon R. Powell, Long Beach, Calif., assignor to Eastwood Acceptance Corp., Los Angeles, Calif., a corporation of California Application May 31, 1955, Serial No. 512,061

10 Claims. (Cl. 29—544)

The present invention relates generally to the field of metal forming and more particularly to a process of forming close tolerance tubing.

During the past few years, a demand has developed in certain industries for tubing of uniform wall thickness which must be within tolerances not possible to attain economically by processes and machines now in commercial use. In addition, a demand has also developed for close tolerance tubing in which the external and internal circumferences thereof are truly concentric, as well as tubing in which the bore is tapered. A demand also exists in a number of industries for a process that would permit both close tolerance tubing as well as commercial tubing to be fabricated to a desired shape.

A major object of the present invention is to provide a process that permits commercially available tubing to be transformed to close tolerance tubing of the desired uniform wall thickness, and with the external and internal circumferences thereof, if desired, being truly concentric with one another.

Another object of the present invention is to provide a process by which tubing can be formed to a desired shape, and within the tolerances desired.

A further object of the invention is to supply an economical process of transforming commercial tubing to close tolerance tubing, as well as other shapes of desired configuration, that is relatively simple to carry out, and does not require the use of highly skilled technicians.

Still another object of the invention is to provide a process for the large scale production of close tolerance tubing, and at a lower per unit cost than by any process or machine now in commercial use of which the applicant has knowledge.

These and other objects and advantages of the invention will become apparent from the following description of a preferred form and certain alternate forms thereof, and from the drawings illustrating same in which:

Figure 1 is a side elevational view of a machine that can be used in transforming commercial tubing to close tolerance tubing;

Figure 2 is a combined end elevational and transverse cross-sectional view of the machine taken on the line 2—2 of Figure 1;

Figure 3a is an enlarged side elevational view of a portion of the machine shown in Figure 1;

Figure 3b is an enlarged side elevational view of another portion of the machine shown in Figure 1;

Figure 4 shows a commercial stock tube being transformed to one having side walls of lesser but uniform thickness by a first process;

Figure 4a is a fragmentary cross-sectional view of a tube prior to the process being carried out thereon;

Figure 4b is a fragmentary cross-sectional view of a tube after the transformation process has been carried out thereon;

Figure 5 shows a commercial stock tube being transformed to a close tolerance tube by a second process;

Figure 5a is a fragmentary cross-sectional view of a tube prior to the second process being carried out thereon;

Figure 5b is a fragmentary cross-sectional view of a tube after the second process has been carried out thereon;

Figure 6 shows a commercial stock tube being transformed to a close tolerance tube by a third process;

Figure 6a is a fragmentary cross-sectional view of a tube prior to the third process being carried out thereon;

Figure 6b is a fragmentary cross-sectional view of a tube as the second process is carried out thereon;

Figure 7 shows a longitudinal cross-sectional view of a tube that is gripped at the ends thereof, but before it is placed in tension;

Figure 8 is another view of the tube shown in Figure 7 but with a mandrel inserted therein;

Figure 9 is another view of the tube shown in Figure 7 but with a mandrel disposed on the inside thereof and a forming die situated on the outside thereof;

Figure 10 shows a longitudinal cross-sectional view of a tube as it is transformed to one having a tapered bore;

Figure 11 is a diagrammatic view of a tube and accessories showing the manner by which heat is applied to the exterior of the tube to permit a bore of uniform cross section to be formed therein;

Figure 12 is a diagrammatic view of a tube and accessories showing the manner by which heat and pressure applied to the interior of the tube result in a bore of uniform cross section being formed therein;

Figure 13 is a diagrammatic view of means that permit true concentricity to be obtained between the internal and external circumferences of a transformed tube;

Figure 14 is a diagrammatic view of a commercial stock tube and apparatus for expanding same to a tube of considerably large diameter, but a tube of uniform wall thickness;

Figure 15 is a longitudinal cross-sectional view of an apparatus to form a tube to a desired non-tubular shape;

Figure 16 is a vertical cross-sectional view of the apparatus shown in Figure 15 taken on the line 16—16 thereof;

Figure 17 is a perspective view of a tube after it has been formed to the desired shape by the apparatus shown in Figures 15 and 16; and Figure 18 is a perspective view of the shaped tube shown in Figure 17 after surplus material has been removed therefrom.

Referring now to the drawings for the general arrangement of my invention, it will be seen that by the use of a machine A shown generally in Figure 1 and more specifically in Figures 2 to 9, inclusive, stock tubing T of a resilient material can be transformed to close tolerance tubing. In general, the transformation of commercial stock tubing to close tolerance tubing is effected by subjecting the stock tubing T to tension under controlled conditions with the tension producing force being increased until the yield point of the material is passed, and then further increased until the tubing side wall has thinned out to the desired degree.

The above mentioned method is preferably carried out by the machine M shown in Figure 1 that includes two spaced upright standards 10 and 12 that tend to be restrained from pivoting inwardly towards one another by reinforcing members 10a and 12a. Both the standards and reinforcing members preferably have the lower portions thereof embedded in a heavy concrete floor or slab 14. Two vertically disposed heavy supports 16 and 18 are situated between standards 10 and 12, with the supports having a block 20 or other type of guide extending therebetween.

Support 16 is formed with a lug 22 that is pivotally converted by a pin or bolt 24 to the eye 26 on one end of a horizontally positioned rod 28. Rod 28 has the end thereof opposite eye 26 connected to one side of a hollow bellows like vessel 30 that can be expanded or contracted by hydraulic fluid that is admitted to the confines thereof by a tube 34. Vessel 30 is connected by a heavy flange or collar 36 to the inwardly disposed face of support 16.

A horizontally disposed hydraulic cylinder 38 is mounted on support 18 as can best be seen in Figure 1. A second bellows like vessel 40 is provided, with one side of the vessel being anchored by a rod 42 to standard 12, and the other side connected by a rod 44 to the outwardly disposed end of cylinder 38.

Block 20 is formed with guide means 48 on the top thereof, which guide means can be longitudinally extending rails or grooves on which wheels 50 of a tubing gripping carriage 52 are rotatably supported. The carriage 52 is rigidly connected by a flange assembly 54 and bolts 56 to the upper portion of support 16 as shown in Figures 1 and 3a.

An elongate mandrel 58, that has a transverse cross section of slightly smaller dimensions than that of the tube to which the tube T is to be transformed, extends through a bore 60 formed in standard 16, as well as a longitudinally extending bore 62 in carriage 52. Mandrel 58 by a coupling 64 is connected to a short rod 66 that is held in a horizontal position by an arm 68 that extends upwardly from a base 70. The base 70 is provided with wheels 72 that engage grooves or rails 74 and movably support the base therefrom. Rod 66 has an eye 75 formed on the outer end thereof, which eye by a bolt 76 is pivotally connected to a piston rod 78 that extends into the confines of a hydraulic cylinder 80. The cylinder 80 has a piston 82 slidably mounted therein that is connected to rod 78. Hydraulic fluid under pressure can be introduced into cylinder 80 to move piston 82 through a conduit 84. Cylinder 80 is supported in a horizontal position on mounts 86 of a conventional design.

In Figure 3b it will be seen that a second tubing gripping carriage 86 is provided and movably supported on wheels 88 that movably engage grooves or rails 48. Carriage 86 has a piston rod 90 extending outwardly therefrom to pass through a bore 92 in support 18 and then into the confines of cylinder 38. A piston 94 is slidably supported within the confines of cylinder 38 and rigidly connected to rod 90. Cylinder 38 is preferably formed with a flange 96 on the inwardly disposed end thereof through which bolts 98 pass to engage tapped bores on support 18, and hold the cylinder in a rigid fixed position thereon. Hydraulic fluid under pressure is admitted to cylinder 38 to move piston 94 through a conduit 100 as shown in Figure 3b. Fluid can be discharged from cylinders 38 and 80 through conduits 100 and 84 respectively, or separate conduits (not shown) if desired.

A third carriage 102 is also provided as shown in Figures 1 and 3a, and includes a base 104 that is movably supported on the grooves or rails 48 by wheels 106. A sizing die 108 is mounted on carriage 102 and is adapted to engage the exterior surface of the tube T as will hereinafter be explained in detail.

Carriage 52 as can be seen in Figure 3a embodies a base 108 that is movably supported on grooves or rails 48 by wheels 110. The tubing gripping portion of the carriage is provided by a cylindrically shaped shell 112 in which a second shell 114 is disposed. Shell 114 has a bore 116 extending longitudinally therethrough that terminates on its inwardly disposed end in an annular tapered seat 118. An elongate piston 120 in which bore 62 is formed is adapted to be disposed in bore 116. Piston 120 is formed with a tapered exterior end portion 122 that is at substantially the same angle as the seat 118. One end of the tube T is formed with a tapered portion 124, which portion is tapered at substantially the same angle as the seat 118 and piston taper 122. The tapered end portion 124 of the tube is disposed inside carriage 52, and in abutting engagement with seat 118 and piston taper 122. Piston 120 can be advanced by hydraulic fluid admitted to bore 116 through a passage 119 formed in shells 112 and 114 and a conduit 121 that extends to the source of fluid that maintains the necessary pressure thereon. The pressure on the hydraulic fluid must be such as to cause piston portion 122 and seat 118 to frictionally grip the tapered tube portion 124 to prevent the tube T separating from the carriage when under tension.

Carriage 86 is substantially identical to carriage 52 in structure. Accordingly, the detailed structure of carriage 86 will not be described. The components of carriage 86 that are identical to those in carriage 52 are identified in Figure 3a by the same numerals, but to which numerals primes have been added. Piston 122' is preferably actuated to grip the tapered tube end portion 124 in the same manner as piston 122.

The process of using the machine A to transform commercial stock tubing T to close tolerance tubing is extremely simple. Carriages 52 and 86 are first spaced from one another a sufficient distance to accommodate the particular length of tubing T that is to be transformed to close tolerance tubing. Tubing T then has the flared ends 124 and 124' thereof gripped in the carriages 52 and 86 as previously described in detail. Hydraulic fluid is caused to discharge into cylinder 80 through a conduit 140 to advance piston 82 and mandrel 58 to the position shown in Figures 3a and 3b. Fluid already in the cylinder 80 is discharged outwardly therefrom through the conduit 84. Hydraulic fluid under pressure is admitted into cylinder 38 through a conduit 100 to cause piston 94 to move outwardly and place tension on the tubing T.

Pressure on the fluid in cylinder 38 is increased until carriage 86 has moved to the extent that the tension on tubing T has passed the yield point of the material forming same. Tubing T is now being permanently deformed, and the deformation of the tubing is continued by increasing the pressure on the fluid in cylinder 38 until the sidewall of the tubing has decreased the desired amount. It will of course be apparent that the thinning of the side walls of tubing T is accompanied by a lengthening of the tubing.

During the time tubing T is being subjected to tension, the supports 16 and 18 are subjected to strong turning movements that tend to turn the supports inwardly towards one another. To maintain tubing T and mandrel 58 in a true horizontal plane in order that the transformed tubing will be perfectly straight, it is essential that the supports 16 and 18 not move from positions perpendicular to the base or floor 14. Such deviation as the supports 16 and 18 might tend to make due to the loading thereon is compensated for by admitting hydraulic fluid under pressure to the vessels 20 and 40. Should it be desired, turnbuckles or other means could be employed to shorten or lengthen the spacing between the standards 10 and 12, and the supports 16 and 18 respectively. After the tubing T has been deformed sufficiently as to provide tubing of the desired wall thickness, the tensioning load on tubing T is released and hydraulic fluid is admitted to cylinder 80 through conduit 84 to move the mandrel 58 out of the confines of the transformed tubing. The tubing is then removed from the carirages 52 and 86 and another piece of tubing T with flared ends substituted in its stead.

It will be apparent that in the above described operation the mandrel 58 serves as a means to prevent the internal diameter of the tubing being reduced below a certain predetermined value. Quite often commercial stock tubing has wall thicknesses that vary, and it will be apparent that merely deforming the tubing to a thinner wall section will not remove these variations in thickness. Therefore, under some conditions it is desirable to use a sizing die 108 as shown in Figure 3a. The die 108 has jaws 150 that slidably engage the exterior surface of the tubing after it has been deformed the desired amount. Jaws 150 are formed with exterior tapered surfaces 152 that slidably engage the interior annular tapered surface 154 of a cylindrical shell 156. The shell 156 is in turn mounted in a housing 158 that can be either rotatably or rigidly affixed to the third carriage 102. Carriage 102 when advanced to the left as shown in Figure 3a or to the right as shown in Figure 6 forces surplus metal ahead of it as shown in Figure 6b, and with the result that all tubing that has passed through the die is of uniform wall thickness. In addition, the use of the sizing die 108 assures the contact of the interior surface of the tubing with the exterior surface of the mandrel 58.

The machine above described could, if desired, be modified to transform tubing T to close tolerance tubing by the method shown in Figure 4. In this method stub mandrels 170 and 170' are placed in the end portions of the tube T, and split jaws 172 and 172' are caused to engage the exterior surfaces of the tubing above the stub mandrel. Jaws 172 and 172' are preferably formed with tapered exterior surfaces 174 and 174' that engage oppositely tapered surfaces 176 and 176' formed in housings 178 and 178'. When the spacing between housings 178 and 178' increases, the tension on tubing T increases, and the tubing can thus be deformed the desired amount as previously explained in detail.

The method as shown in Figure 5 is identical to that shown in Figure 4 with the exception that an elongate mandrel 58 is provided in lieu of the stub mandrel 170.

In Figure 6 a third method is disclosed that is identical to the method shown in Figure 5, with the exception that a sizing die 108 is used in conjunction therewith. The die 108 serves the same function as it does in conjunction with the machine A.

Figures 7, 8 and 9 summarize the three methods that can be used in forming close tolerance tubing by use of the machine A.

When it is desired to have true concentricity of the interior and exterior circumferences of the transformed tubing, the housing 158 of the sizing die can be so mounted on carriage 102 to move on both the X and Y axes. In Figure 13 it will be seen that two pairs of elements 190, 190' and 192 and 192' are provided that are in contact with the exterior surface of the transformed tubing. Each pair of elements is sensitive to variations in wall thickness in the transformed tubing, and are capable by electrical, sonic, hydraulic, or other means of signaling a servo mechanism 194 that a thickened wall section exists, and the servo mechanism by means (not shown) causing the housing 158 to shift on carriage 102 to correct this condition.

In addition to transforming commercial stock tubing to close tolerance tubing of uniform bore, my invention can also be used to form tubing having a tapered bore. The forming of tubing with a tapered bore by the use of machine A is shown in Figure 10.

Tubing T is placed in tension by use of the two tube gripping carriages 52 and 86 as previously described in detail. A tapered mandrel 58' is substituted for mandrel 58 shown in Figures 3a and 3b. The use of the sizing die 108 is dispensed with when the tubing T is to be transformed to tubing with a tapered bore. In place of the sizing die, two pressure members 190 are substituted as shown in Figure 10. The two pressure members engage opposite sides of the tube and are mounted on rods 192 which by means (not shown) can be moved inwardly as well as longitudinally relative to the tubing T. By applying an appropriate inward force to each of the rods 192, the members 190 can be caused to move the tubing T inwardly into contact with mandrel 58'. Rods 192 are then moved longitudinally relative to tubing T to force same into contact with mandrel 58'. Should it be desired this longitudinal movement of the pressure member 190 can be accompanied by rotary motion about the axis of the mandrel to assure that all portions of the tube will be brought in contact therewith.

In all of the previously described uses of the machine A, tensioning of the tubing T above the yield point of the material forming same results in a thinning of the side wall of the tubing with an accompanying decrease in the internal diameter of the tubing, unless such decrease in internal diameter is prevented or minimized by mandrel 58. Thus, tubing T by tensioning alone can be transformed to tubing of a desired thinner wall section, and with the internal diameter of the bore being controlled or not, depending on whether a mandrel is used in the operation.

A modification of the method shown in Figure 10, which can be used when it is desired to provide transformed tubing having a tapered bore, such as a shot gun barrel, is to tension the tubing T until the internal diameter thereof has decreased to substantially that of the smaller end of the tapered mandrel. By the use of this method a transformed tubing is provided that has a substantially uniform external diameter, and a tapered internal diameter that has the same accuracy as the tapered mandrel that served as a pattern in its formation. This modification of the method shown in Figure 10 would permit the production of highly accurate tapered shot gun barrels at but a fraction of their present cost.

Although the tubing T when placed in tension above the yield point of the material forming same will decrease in internal diameter, under some conditions it is desirable to apply radial pressure to the external surface of the tubing T to effect such contact with the mandrel. For instance in the formation of a tapered shot gun barrel, it might not be desirable to tension the tubing T to the extent that the internal diameter thereof is reduced to that of the smallest end of tapered mandrel 58'. When such is the situation, inwardly directed pressure is placed on the external surface of the tubing, and this pressure is of such magnitude as to augment the tension already on the tubing into forcing the interior surface of the tubing into contact with the mandrel to assume the configuration thereof. Inwardly directed forces can be applied to the external surface of tubing T either by using the sizing die 108 or the pressure members 190 shown in Figure 10. Although means are not shown for rotating the sizing die 108, the invention contemplates both sliding and rotational movement of die 108 relative to the external surface of tubing T, as well as sliding and rotational movement of members 190.

Should it be desired to have rotational movement between the external surface of tubing T and radial pressure applying means, the tube gripping portions of carriages 52 and 86 can be caused to rotate by means (not shown), and the tubing accordingly rotated relative to die 108 or members 190 as the case may be.

Another variation in the process of transforming commercial stock tubing to close tolerance tubing is shown in Figure 11. An induction heating coil 200 is placed in an encircling position relative to tubing T, with the coil being so mounted by means (not shown) that it can be moved longitudinally relative to the tubing if desired. Tubing T is placed in tension on machine A, a section of the tubing nearest carriage 52 is heated by use of induction coil 200, and then mandrel 58 that has a ball 58a of the diameter to which it is desired to form the bore of the transformed tubing is advanced therethrough. Longitudinal movement of the coil 200 and the ball 58a relative to the tubing T is preferably carried out concurrently.

Another variation in the process of forming close tolerance tubing by use of the machine A is to first place the tubing in tension beyond the yield point of the material forming same, and then advance mandrel 58 which has the ball 58a on the outer extremity thereof through the tubing as shown in Figure 12. In this variation of the process of forming close tolerance tubing, heat is supplied to the ball by a resistance element 58b that is embedded therein. Thus, heat can be supplied to the tubing T either from the outside as shown in Figure 11, or from the interior of the tubing as illustrated in Figure 12.

In those situations where it is desired to expand the internal diameter of tubing T, with consequent relatively large reduction in the side wall thickness of the transformed tubing, the machine A can be used in the manner shown in Figure 14. Mandrel 58 has an enlarged tapered head 58c mounted on the extremity thereof, with the largest diameter of the head being substantially that of the internal diameter of the transformed tubing. Two or more tapered rollers 206 or other suitable pressure elements are provided, and caused at all times to engage the exterior surface of that portion of tubing T that has the interior surface thereof engaged by head 58c. The head 58c and the rollers 206 are concurrently advanced relative to tubing T to expand same to close tolerance tubing as shown in Figure 14. The spacing between the rollers 206 and the tapered face of head 58c is maintained at a predetermined fixed value by means (not shown) to obtain expanded tubing of substantially uniform wall thickness. Rollers 206 in addition to longitudinal movement relative to tubing T can be caused to revolve around same by means (not shown) to assure that the entire interior surface of the tubing T is brought into pressure contact with head 58c.

In Figures 15 to 18 inclusive an apparatus and method are illustrated that permit either commercial stock tubing or close tolerance tubing to be accurately formed into irregular shapes S such as turbine blades and the like. In this forming of tubing to a desired shape a die block 220 is provided that comprises a bottom portion 222 and top portion 224. Top portion 224 is hinged to bottom portion 222 by pins 226 or such other means as may be desired to control movement between the top and bottom portions. The top portion 224 and bottom portion 222 have recesses 224a and 222a respectively, formed therein, which recesses when the die is closed define a cavity 228, at least a part of which cavity defines the shape to which the tube is to be formed.

Tubing 230 that has a mandrel 232 disposed therein and is first subjected to a stretching and twisting action as shown in Figure 15 and the mandrel and stretched tubing are then inserted within the confines of the die block. Tubing when stretched and twisted has one end portion 230a gripped by a jaw assembly 234 and the other end portion 230b gripped by a second jaw assembly 236. By rotating either one or both of the jaw assemblies as shown in Figure 15, the tubing 230 is placed in tension and the interior surface of the tubing caused to conform to the configurations of the mandrel 232. The mandrel and stretched tubing thereon are then placed in die block 220, and the portions 222 and 224 closed to cause the exterior surface of the formed tubing to take the configuration of cavity 228.

When the tubing forming operation is completed, the die block is opened and the formed tube and mandrel removed therefrom. In Figure 17 it will be seen that the formed tubing has certain surplus material 240 thereon which is removed by a cutting operation. The two edges 242 are, if necessary, bonded together by welding or the like. This particular forming operation is illustrated by use of tubing 230, but if desired sheet material or a shaped material may be substituted for the tubing.

The machine A and the various methods of using same have previously been described in detail and need not be repeated.

In the previous described forming of shape S, a tubing of substantially uniform wall thickness was used as the starting material. However, where a shape S is desired that is to have one section of the wall thicker than the balance of the wall, tubing, sheet material, or a shaped material of different wall thickness is used as the starting material. The thicker portion of the starting material is so oriented on mandrel 232 during the stretching operation as to be in position to form a thicker wall section of the shape S when the tubing is subjected to the action of the die block 220.

In connection with the operation of the machine A when it is used with the concept of the invention as illustrated in Fig. 13, it will be apparent that the carriage 52 must be held in a fixed vertical position on the guides 48 to prevent vertical shifting of the carriage. Numerous mechanical structures of a conventional nature are available for such purposes, such as the use of gibs and the like, and which due to their widespread usage for such purposes have not been illustrated.

The invention has been illustrated by the use of tubing T of circular cross section. It will be apparent, however, that the invention is also equally applicable to tubing of non-circular cross section. The word tubing as used in the specification and claims is intended to cover tubing of both circular and non-circular cross section.

One outstanding advantage of the machine A and the use of the sizing die 108, mandrel head 58c and rollers 206, as well as pressure members 190, is that the stressing in the transformed tubing T can be controlled. Thus, in those situations where it is desired to have the major stressing in the transformed tubing in a longitudinal direction, the major shaping of the transformed tubing is accomplished by the placing of tension thereon. The sizing die, rollers 206, or pressure members 190 merely exert sufficient radial pressure on the tubing T to bring the tensioned portion thereof to the desired external dimensions. When the major stressing in the transformed tubing is to be in a circumferential direction, the operation is simply reversed, with the major transforming of the tubing being by mandrel head 58c and rollers 206, head 48a, or die 108.

Although the forms of the invention herein shown and described are fully capable of achieving the objects and providing the advantages hereinbefore mentioned, it is to be understood that they are merely illustrative of the presently preferred embodiments of the invention and that there is no intention to limit the invention to the details of construction herein shown and described other than as defined in the appended claims.

I claim:

1. A cold stretching method for transforming stock tubing of a deformable material to close tolerance tubing of a predetermined wall thickness that comprises the steps of: disposing a length of said stock tubing in a single plane; placing said entire length of tubing under tension in a cold state by opposed forces applied to the end portions thereof; increasing the tension on said length of tubing by increasing said forces until the yield point of the material forming same has been exceeded; and continuing to increase the tension on said length of tubing by further increase of said forces until the initial wall thickness thereof has decreased to said predetermined thickness.

2. A cold stretching method as defined in claim 1 in which an elongate first rigid cylindrical surface is disposed in said stock tubing prior to said forces being applied thereto to the extent that permanent deformation of said material takes place.

3. A cold stretching method as defined in claim 2 in which said first rigid surface has a transverse cross sectional area that is slightly smaller than that of the transverse area of the bore of said tubing after said transformation has been completed.

4. A cold stretching method as defined in claim 3 in which the exterior surface of said tubing when said tubing is in tension but prior to transformation of said side wall to said predetermined thickness is subjected to a second rigid surface that is moved longitudinally on the exterior surface of said tubing at a fixed spacing relative to said first surface that is less than the initial minimum wall thickness of said stock tubing.

5. A cold stretching method as defined in claim 4 in which said second rigid surface is of a cylindrical configuration.

6. A cold stretching method as defined in claim 4 in which said second rigid surface is additionally subjected to rotary motion as said second surface moves longitudinally relative to said tubing.

7. A cold stretching method as defined in claim 5 in which said second rigid surface is shifted both vertically and horizontally relative to said first surface as it moves longitudinally relative to said tubing to obtain true concentricity between the inner and outer circumferences thereof.

8. A cold stretching method of transforming stock tubing formed of a deformable material to close tolerance tubing of a predetermined wall thickness that is characterized by: disposing a length of said stock tubing in a single plane; placing said entire length of stock tubing in tension in a cold state by applying oppositely directed forces to the end portions thereof; increasing said tension on said tubing by increasing said forces until the yield point of said material is exceeded; and moving a rigid tapered cylindrically shaped surface through the bore of said tubing when under said tension and the magnitude of said tension being so selected that said movement of said tapered surface and said tension cooperate to increase the internal transverse cross section of said tubing and thin said wall to said predetermined thickness.

9. A cold stretching method of transforming stock tubing to close tolerance tubing of predetermined wall thickness and having a tapered bore formed therein that comprises the steps of: disposing said stock tubing in a single plane; placing said entire length of said stock tubing in tension in a cold state by application of opposed forces to the end portions thereof; placing an elongate tapered rigid first surface within the confines of said stock tubing; increasing the tension on said stock tubing by increasing said forces until the yield point of the material forming same is exceeded; continuing to increase the tension on said length of tubing by further increase of said forces until the initial wall thickness of said tubing has decreased to said predetermined thickness and subjecting the exterior surface of said tubing of predetermined wall thickness to a plurality of rigid second surfaces that move longitudinally relative thereto and are concurrently forced inwardly towards said tapered first surface to cause the interior surface of said tubing to conform to the contour thereof.

10. A cold stretching method of transforming stock tubing to an irregular shape that comprises the steps of: defining a rigid confined space of the shape that it is desired to form the exterior surface of said tubing; inserting a rigid surface inside said tubing of the shape that is desired to form the interior surface thereof; twising the end portions of said tubing in a cold state to deform said tubing to conform to the configurations of said rigid surface; inserting said deformed tubing and rigid surface in said confined space and forcing the exterior surface of said deformed tubing to conform to the configuration thereof; removing said tubing and rigid surface from said confined space; and severing surplus material from said transformed tubing.

References Cited in the file of this patent

UNITED STATES PATENTS

| | | |
|---|---|---|
| 1,295,430 | Carlson | Feb. 25, 1919 |
| 1,827,766 | Rosenburgh | Oct. 20, 1931 |
| 2,049,577 | Walzer | Aug. 4, 1936 |
| 2,051,948 | Inscho | Aug. 25, 1936 |
| 2,051,949 | Inscho | Aug. 25, 1936 |
| 2,056,689 | Reher | Oct. 6, 1936 |
| 2,108,790 | Inscho | Feb. 22, 1938 |
| 2,336,524 | Bannister | Dec. 14, 1943 |
| 2,522,780 | Dickson | Sept. 19, 1950 |